March 3, 1964 T. P. KAUFMAN 3,123,721

GATE WITH ADJUSTABLE VOLTAGE REFERENCE LEVEL

Filed Oct. 28, 1960 2 Sheets-Sheet 1

INVENTOR.
THEODORE P. KAUFMAN
BY Moody and Antrim
AGENTS

March 3, 1964 T. P. KAUFMAN 3,123,721

GATE WITH ADJUSTABLE VOLTAGE REFERENCE LEVEL

Filed Oct. 28, 1960 2 Sheets-Sheet 2

INVENTOR.
THEODORE P. KAUFMAN
BY Moody and Antrim
AGENTS

United States Patent Office 3,123,721

Patented Mar. 3, 1964

3,123,721
GATE WITH ADJUSTABLE VOLTAGE REFERENCE LEVEL

Theodore P. Kaufman, Plano, Tex., assignor to Collins Radio Company, Cedar Rapids, Iowa, a corporation of Iowa Filed Oct. 28, 1960, Ser. No. 65,715
3 Claims. (Cl. 307—88.5)

Figure 1:
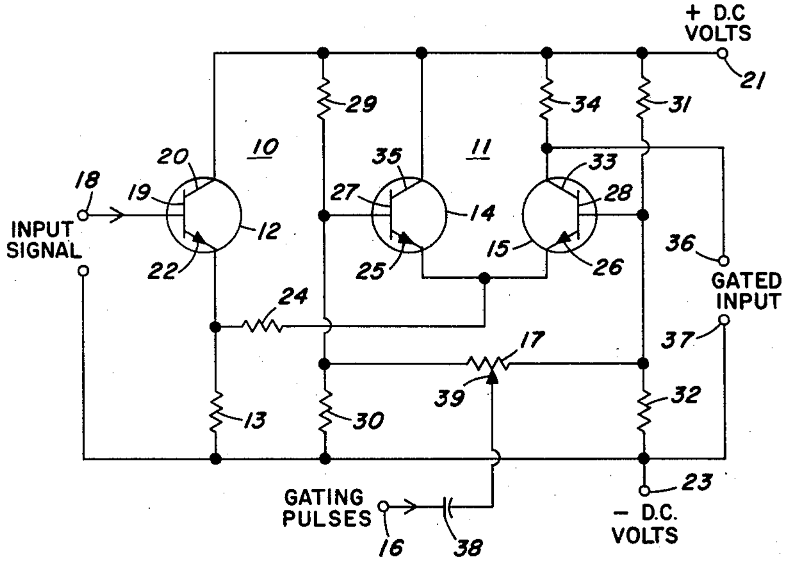

This invention pertains to gating or electronic switching circuits, and particularly to switching circuits that are to provide an adjustable predetermined level of output voltage to a succeeding circuit during the intervals that the circuit is open to an incoming signal.

In certain electronic systems, such as communication systems or radar systems, series of impulses from one circuit are alternately connected and disconnected to certain succeeding circuits within the system. These applied impulses are often modulated with respect to a characteristic such as time or amplitude to convey information. The switching of such signals in communication receiving circuits, for example, may be timed according to predetermined intervals of transmission in order to eliminate extraneous signals between intervals. In radar, a return signal may be gated in synchronism with scanning motion of an antenna.

This switching operation in itself may be a source of interference. Interruption of the signal by the controlled switch may apply voltage at such a level that the interruption itself appears as a signal pulse. Undesirable voltage changes are readily produced and difficult to filter in low-frequency or direct-current amplifiers. The switching circuit or gate of this invention has been devolped for application to low-frequency circuits in the video channel of a radar system. The level of the output voltage during the interval that the gate is open is adjustable to that value which causes the least interference with the operation of the equipment.

In order to provide the switching function while maintaining the direct-current reference voltage at a predetermined level at the input of a succeeding circuit, the present invention comprises a switching stage and a differential amplifier stage with two conductive branches, both stages have their input biasing circuits and their output current circuits returned through a common resistor. Normally an input signal is conducted through the switching stage and through one branch of the differential amplifier stage to the succeeding circuit. A source of gating pulses is applied through a voltage divider arrangement to the biasing circuits of the differential stage to change the current flow through the common resistor for applying sufficient bias to the switching stage to operate it beyond its current cutoff point. The voltage divider means in the biasing circuits of the differential amplifier is adjustable for determining the flow of current in one branch of the differential amplifier stage relative to that of the other branch during the application of gating pulses. While the differential amplifier is responsive to the application of gating pulses to provide the total current change required for switching, the voltage across the input of the succeeding circuit as derived from one branch of the differential amplifier stage is maintained at any predetermined level according to the adjustment of the voltage divider providing the required current change is within the range of the amplifying devices that are used in the differential amplifier stage.

An object of this invention is to provide a gating circuit in which the amplitude of deviation of voltage caused by switching is reduced to a minimum.

A feature of this invention is the voltage adjustment means which provides for determination of an output voltage of a predetermined level that exists during the period that an incoming signal is switched off.

Figure 2:
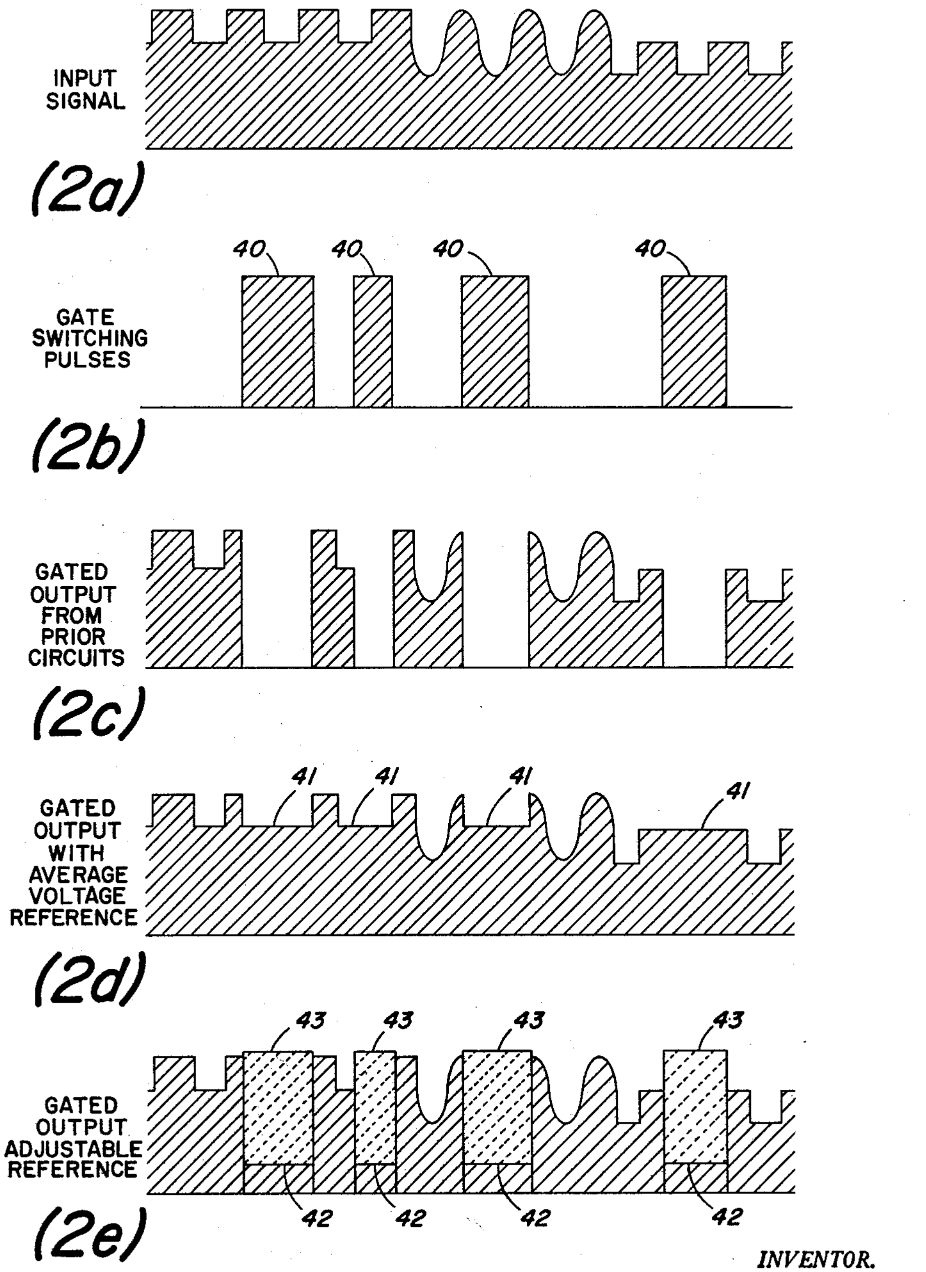

The following description and the appended claims may be more readily understood with reference to the accompanying drawings in which:

FIGURE 1 is a schematic diagram of a gate according to the present invention; and FIGURE 2 shows waveforms *2a* to *2e* for comparing output signals upon which different direct-current voltage levels have been superimposed with the input signal from which they were derived.

This invention, as exemplified in FIGURE 1, comprises a switching stage 10 and a succeeding differential amplifier stage 11. The switching stage includes a transistor 12 which is at times cut off by a bias voltage developed in response to the application of gating pulses across resistor 13 which is connected in the emitter circuit of the transistor. The differential amplifier stage 11 includes transistors 14—15 which have a common emitter circuit that is also connected to the resistor 13. The combined current flow of transistors 14—15 is increased in response to the application of gating pulses to input terminal 16. This increased current flow through the common resistor 13 provides voltage for biasing transistor 12 beyond its cutoff point. The potentiometer 17 is connected between the source of gating pulse 16 and the biasing circuits of transistors 14—15 to determine the relative change in current flow of one transistor to that of the other. Therefore, the voltage across the output circuit which is connected to the transistor 15 of the differential amplifier may be predetermined within a wide range during the application of gating pulses so that it is either equal to above or below the average voltage in the output circuit.

In detail, a source of impulses is connected to the signal input terminal 18 which is connected to base 19 of a type NPN transistor 12. The collector 20 of transistor 12 is connected to terminal 21 of a direct-current voltage source. The collector-emitter circuit is completed through the resistor 13 which is connected between the emitter 22 of transistor 12 and terminal 23 of the direct-current voltage source. The direct-current voltage developed across the resistor 13 is algebraically added to the direct-current component of the input signal to provide the base-to-emitter bias for the transistor 12, and the voltage variations developed across resistor 13 provide a signal voltage for application to the emitter circuits of the succeeding differential amplifier. The signal voltage is applied to the differential amplifier stage through resistor 24 which is connected between the emitter 22 of transistor 12 and the joined emitters 25—26 of transistors 14—15, respectively.

Each of the bases 27—28 of the transistors 14—15, respectively, is connected to an intermediate point of a voltage divider which is connected between terminals 21 and 23 of the direct-current voltage source. The divider for biasing the base 27 comprises the resistors 29—30, and a similar voltage divider comprises the resistors 31—32 for applying a substantially fixed bias to the base 28 of transistor 15. The collector 33 of transistor 15 is connected through an output load resistance 34 to the terminal 21 of the direct-current voltage source.

The output terminals 36—37 are connected to the collector circuit of transistor 15 for applying voltage variations which are developed across resistor 34 to a succeeding circuit. Usually collector 35 is connected directly to terminal 21 of the direct-current voltage source. If desired, a resistor may be connected between the collector 35 and terminal 21 and a second output circuit may then be connected to the collector. The direct-current reference voltage from a second output would vary inversely with that of the output which is shown in response to adjustment of tap 39 of potentiometer 17.

A source of gating pulses is connected to the terminal 16 which is coupled either directly or through capacitor 38 to the adjustable tap 39 of potentiometer 17. The potentiometer 17 is connected between the base 27 of transistor 14 and the base 28 of transistor 15. The application of positive gating pulses to terminal 16 increases the base emitter bias of transistors 14—15 of the differential amplifier over that amount which is normally supplied by the voltage dividers which comprise resistors 29—30 and 31—32, respectively.

A typical circuit may use type 2N377 transistors for transistors 12, 14, and 15. If the circuit is to gate signals which have a peak voltage of approximately 1 volt and to which is applied a gating pulse of approximately 10 volts, the resistor values are as follows:

| | Ohms |
|---|---|
| Resistor 13 | 3,300 |
| Resistor 24 | 1,800 |
| Resistors 29 and 31 | 18,000 |
| Resistors 30 and 32 | 12,000 |
| Potentiometer 17 | 5,000 |
| Resistor 34 | 3,900 |

The advantage of using a circuit of FIGURE 1 for eliminating wide deviations of voltage in the output may be more readily understood by reference to FIGURE 2. An input signal with a direct-current component as shown in FIGURE 2*a* is applied to the signal input terminal 18. Gating pulses 40 of FIGURE 2*b* are applied to the gating input 16. During the absence of gating pulses, the input signal is coupled from emitter 22 of transistor 12 to emitter 26 of transistor 15. A signal voltage that is developed across resistor 34 in the collector circuit of transistor 15 is then applied to output terminal 36 for application to a succeeding circuit. If potentiometer 17 is adjusted so that the direct-current voltage which is applied to the succeeding circuit during the application of a gating pulse is approximately equal to the average direct-current voltage during the absence of pulses, the voltage across the output load circuit may then be represented by the waveform shown in FIGURE 2*d*. When FIGURE 2*d* is compared with FIGURE 2*a* in which a substantial direct-current component is present, it is obvious that no high voltage deviation exists during switching transitions. The waveform in FIGURE 2*c*, in which a direct-current voltage component during the switching interval has returned to zero, shows much greater deviation than that shown in FIGURE 2*d* in which the voltage level 41 has been predetermined by adjustment of tap 39 of potentiometer 17. The output of prior circuits that have no provisions for inserting a direct-current component during the off-interval has wide deviations as shown in FIGURE 2*c*.

During the application of gating voltage, both transistors 14—15 of the differential amplifier remain conductive. The increased current from both emitters through common resistor 13 increases the base emitter bias of switching transistor 12 so that the base-emitter current thereof is cut off. The ratio of the emitter current of transistor 15 to that of transistor 14 during the open interval is determined by the position of tap 39 of potentiometer 17.

The tap 39 may be adjusted so that the ratio of the direct-current component to the signal component of the output signal during the off-interval is the same, large, or small compared with the ratio of the direct-current component to the signal component at the input. If tap 39 is adjusted for applying a greater portion of the bias to the base 28 of transistor 15 than that required for obtaining the direct-current component 41 of FIGURE 2*d*, the direct-current component may be reduced to a low value such as the value 42 in FIGURE 2*e*. As the tap is adjusted so that the current in the emitter base circuit of transistor 14 is increased, the voltage across series resistors 13 and 24 gradually increases to such a high value that the emitter base current of transistor 15 finally actually decreases. When tap 39 is positioned for applying a greater proportion of the bias voltage to transistor 14, the direct-current component across the output circuit may be increased to a value such as value 43 of FIGURE 2*e*. Obviously, the tap may be adjusted for obtaining any values between values 42 and 43 that are within the linear operating characteristics of transistors 14—15.

Although this invention has been described with reference to a particular embodiment which uses transistors, the circuit may be modified in ways obvious to those skilled in the art and still be within the spirit and scope of the following claims. The emitter circuits of the transistors correspond to the cathode circuits of a similar modification which uses electron tubes. The collector circuits correspond to anode or plate circuits, and the base circuits correspond to control-grid circuits.

I claim:

1. An electronic gate with adjustable output-voltage level having first, second, and third electron discharge devices, each of said electron discharge devices having an input circuit and an output circuit, said second and third electron discharge devices being connected as a differential amplifier in cascade with said first discharge device, first and second resistors connected in common with said first electron device and said first and second electron devices of said differential amplifier, the input circuit of said first discharge device having a biasing circuit including said first resistor in common with the output circuit of said first discharge device, the input circuits of said second and third discharge devices each having a biasing circuit which includes a portion in common including said first and second resistors connected in series, said first and second resistors also being in series in the combined output circuits of said second and third discharge devices, the average current flow in said output circuits of each electron discharge device being controlled by the bias applied to respective input circuits, means for applying a signal that is to be gated to the signal input circuit of said first electron discharge device, an external output load circuit being connected to the output circuit of one of said electron discharge devices in said differential amplifier circuit, the input signal normally being conducted to the output circuit of said first electron discharge device and coupled through said first and second resistors to said differential amplifier for application to said external output load circuit, adjustable voltage divider means for applying gating pulses of voltage simultaneously to separate portions of said biasing circuits of said second and third electron discharge devices, said means being adjustable for varying the ratio of the gating voltages that are applied to said biasing circuits of said second and third electron discharge devices, said first electron discharge device being cut off by the voltage change across said first resistor caused by the total change in current of said first and second electron discharge devices responsive to the application of gating pulses to said differential amplifier, and said voltage divider means being adjustable for maintaining a predetermined level of direct-current voltage across said external output load circuit during the application of said gating pulses.

2. A gating circuit having a predetermined reference voltage for its output comprising, a switching stage and a differential amplifier stage, said switching stage having a first transistor, said differential stage having second and third transistors, each of said transistors having an emitter, a base, and a collector, means for connecting an input signal that is to be gated to the base of said first transistor, a first resistor connected to the emitter of said first transistor in the collector-emitter circuit thereof, a resistive voltage divider for each of said second and third transistors connected to the respective base thereof, said dividers normally supplying substantially fixed bias voltages to the bases of said second and third transistors, a second resistor connected between the emitter of said switching stage and both emitters fo said differential amplifier stage, a load resistor connected to the collector in the collector-emitter circuit of one of said transistors of said differential amplifier, an output circuit connected to said collector of said one transistor, all of said transistors normally being conductive for transferring said input signal to said output circuit, a tapped resistor connected between the respective bases of said second and third transistors, means for applying gating voltage to the tap of said tapped resistor, said gating voltage being of the required polarity and amplitude for maintaining said second and third transistors conductive while cutting-off said first transistor, and said first transistor becoming non-conductive in response to the change of voltage across said first resistor caused by the application of said gating voltage.

3. A gating circuit according to claim 2 in which the tap of said tapped resistor is adjustable, said tap being adjustable for providing different predetermined levels of output voltage across said output circuit during the application of said gating voltage.

References Cited in the file of this patent

FOREIGN PATENTS 821,632 Great Britain ____________ Oct. 14, 1959